(12) United States Patent
Yip et al.

(10) Patent No.: US 8,982,130 B2
(45) Date of Patent: Mar. 17, 2015

(54) CLUSTER MAPPING TO HIGHLIGHT AREAS OF ELECTRICAL CONGESTION

(75) Inventors: Dennis Yip, Brooklyn, NY (US); Victor Shao, Mountain View, CA (US)

(73) Assignee: Green Charge Networks, Santa Clara, CA (US)

( * ) Notice: Subject to any disclaimer, the term of this patent is extended or adjusted under 35 U.S.C. 154(b) by 381 days.

(21) Appl. No.: 13/549,337

(22) Filed: Jul. 13, 2012

(65) Prior Publication Data

US 2013/0016106 A1    Jan. 17, 2013

Related U.S. Application Data

(60) Provisional application No. 61/508,530, filed on Jul. 15, 2011.

(51) Int. Cl.
  *G06T 11/20* (2006.01)
(52) U.S. Cl.
  CPC .................................. *G06T 11/206* (2013.01)
  USPC .......................................................... 345/440
(58) Field of Classification Search
  CPC ..................................................... G06T 11/206
  See application file for complete search history.

(56) References Cited

U.S. PATENT DOCUMENTS

| | | | |
|---|---|---|---|
| 2010/0235004 A1* | 9/2010 | Thind | 700/277 |
| 2010/0249976 A1* | 9/2010 | Aharoni et al. | 700/110 |
| 2013/0063278 A1* | 3/2013 | Prosser et al. | 340/870.02 |
| 2013/0332068 A1* | 12/2013 | Kesar et al. | 701/430 |
| 2014/0019461 A1* | 1/2014 | Bredenberg et al. | 707/754 |

* cited by examiner

*Primary Examiner* — Ryan R Yang
(74) *Attorney, Agent, or Firm* — Richard C. Galati; Holland & Hart LLP

(57) ABSTRACT

Methods of generating heat maps of assets using clustering of assets are disclosed. Some methods include receiving a list of assets, assigning the assets to one or more heat range categories based on the status of the assets, assigning assets operating within a zone to a zone cluster, assigning the assets of the zone cluster to category clusters based on the heat range categories assigned to the assets. The positions of the clusters may be calculated for mapping, and may be displayed on a map. Some embodiments of these methods allow a user to quickly detect and locate non-standard assets on a map while standard assets are consolidated to clusters that are less prominent to the user. This leads to minimizing the time required to form responses to de-load hotspots in an electrical grid, minimizing the cost of assets by reducing the need for hardware redundancy, and minimized equipment outages.

20 Claims, 11 Drawing Sheets

CLUSTER MAPPING TO HIGHLIGHT AREAS OF ELECTRICAL CONGESTION

CROSS REFERENCE TO RELATED APPLICATIONS

Priority is claimed to the following related U.S. Provisional Patent Application, which is hereby incorporated by reference in its entirety: Ser. No. 61/508,530, filed Jul. 15, 2011.

BACKGROUND

The present invention relates to the field of information visualization methods, and more particularly to the field of clustering information on a map.

A heat map is a graphical representation of data with values represented as colors or other visual symbols in a two-dimensional shape. Heat mapping gives the reader a representation of data that may be scanned visually to find "hot" and "cold" portions quickly and easily. Some heat maps are superimposed over geographical projections, such as temperature maps showing high and low temperatures across a region or political maps showing the frequency of voting for one party or another from state to state.

Imprecision is an inherent problem with geographical heat maps. While a heat map may give a general idea of the state of a mapped area, it may not sufficiently differentiate between closely positioned points due to spatial constraints or may lose detail and perspective if closely positioned points are combined.

BRIEF SUMMARY

Heat maps are particularly challenging to create in electrical utility applications. There are many assets and points of interest in an electrical distribution grid, but not many ways to effectively present information from sensors on those points to a user because the assets tend to be closely geographically positioned. Therefore finding trouble spots on maps presenting these assets can be time-consuming and difficult. The information would be more effectively utilized if important information is brought to the user's attention and unimportant information is relatively insignificant.

An objective of the systems of the invention is to visually group up electrical utility assets—such as manholes, service boxes, transformers, poles, feeders, and secondary mains—by a "heat" index or other electrical property index to assist in locating and analyzing structures at risk of dangerous conditions such as overheating.

A heat index grouping algorithm of some embodiments of the invention may be applied by clustering assets with similar properties together and assigning a property-representative icon or colored representation to them on a map. Through this method, the system is able to highlight and present abnormal conditions of the grid to the users. Assets that are within the user's view of the map are located and clustered together based on their proximity to each other and a categorization of their sensed properties.

For example, a standard deviation may be calculated based on a database of each asset's analyzed consumption and standard deviation normal distributions are obtained for the assets. The clusters or assets are then assigned a color or other visual indicator based on where they fall on the standard deviation normal distribution. A standard deviation normal distribution includes a majority (~68.2%) of the assets within one standard deviation from the mean of the loaded assets, so the majority of the assets on the map are represented in a small range of colors because of their proximity to the mean. Assets that lie beyond one standard deviation (i.e., beyond plus or minus one sigma) are less common and more notable, so their visual indicators on the map are made more apparent in comparison to the assets that lie near the mean. Using this approach, assets with abnormally high or low properties may be assigned especially-visible icons or colors when compared to the average loads.

After the assets are assigned a heat-range category and the standard deviation normal distribution of the assets is created, the assets within a definable pixel distance of each other on the map are assigned to clusters based on their heat-range category and displayed together. The geographical distance within which assets are combined into clusters is defined based on the user's view or zoom level of the heat map, but the pixel distance is constant at all zoom levels. For example, a higher zoom level (e.g., where the map detail is at street level) produces a larger geographical distance between the clusters, while a lower zoom level (e.g., where detail is at the city level) produces a smaller geographical distance, but in either case, assets that are within a fixed pixel distance (e.g., 128 pixels from a reference point on a computer display) are combined into clusters.

To cluster the assets, an asset in a list of relevant assets may be assigned to be an index asset. The process then loops through the list of unassigned assets and compares the pixel distance between the index and the assets. Assets that are within the defined pixel distance of the index that share the heat-range category of the index are then clustered with the index asset. At the end of the loop, an ungrouped asset is assigned to be the index and the process repeats until all assets have been clustered, even if some clusters only contain one asset, thereby producing a list of clustered assets that are then displayed on the heat map at a point such as the geographic centroid of the coordinates of the assets in the list of clusters.

In one embodiment, a method of generating a heat map of assets is set forth, comprising: receiving a list of assets, the list having asset status information, assigning the assets to one or more heat range categories based on the asset status information, assigning assets operating within a zone to a zone cluster, assigning the assets of the zone cluster to one or more category clusters such that there is one category cluster for each heat range category to which the assets in the zone cluster were assigned, and determining a position for one or more of the category clusters on a map. This embodiment may further comprise displaying a category cluster on the map at the predetermined position.

In some embodiments, the map comprises a user view area, and an indicator is displayed on the map if the category cluster is not within the user view area, the indicator indicating the position of the category cluster. Some embodiments further comprise a step of displaying an animation of changes to the category cluster over time. Some embodiments further comprise displaying the asset status information of one or more assets in a displayed category cluster in response to a user selecting the displayed category cluster. In some embodiments, the asset status information displayed includes the location of one or more assets assigned to the displayed category cluster in the zone. In some embodiments, the position of the category cluster is determined as an average or centroid of the positions of all assets assigned to the category cluster.

In some embodiments, the zone is a microgrid and the assets are electrical devices connected to the microgrid. In some embodiments, the zone is an electrical network and the assets are electrical devices connected to the electrical network. In some embodiments, the electrical network is contained within a building or structure. In some embodiments, the zone is a geographical area and the assets are electrical devices in the area. In some embodiments, the geographical area is defined by a distance from an index asset. In some embodiments, the distance is defined by a pixel distance as displayed by the map to a user.

In another embodiment, a non-transitory computer readable medium including computer-executable instructions stored thereon for performing a method for generating a heat map of assets is provided, and the method comprises: receiving a list of assets, the list having asset status information, assigning the assets to one or more heat range categories based on the asset status information, assigning assets operating within a zone to a zone cluster, assigning the assets of the zone cluster to one or more category clusters according to the heat range category assigned to the assets of the zone cluster such that there is one category cluster for each heat range category to which the assets in the zone cluster were assigned, and determining a position for one or more of the category clusters on a map. In some embodiments, the method further comprises displaying a category cluster on the map at the determined position. In some embodiments, the method further comprises displaying the status information of one or more assets in a displayed category cluster in response to a user selecting the displayed category cluster.

In yet another embodiment, a method of generating a heat map of electrical assets is provided, comprising: receiving a list of assets, the list containing an electrical property for each of the assets, assigning the assets to heat range categories based on the electrical property, assigning assets within the same heat range categories that are also within a zone to clusters, the clusters corresponding to each heat range category to which assets were assigned, and determining a position for one or more of the clusters on a map. In some embodiments, the method further comprises displaying the clusters on the map at determined positions. In some embodiments, the heat range categories are determined based on the statistical deviation of the electrical property of each asset from a representative value of the electrical properties of all the assets. In yet other embodiments the heat range categories comprise predetermined ranges of possible values of the electrical property of each asset.

The heat index clustering algorithms are designed to optimize electrical hotspot detection in the distribution grid, microgrid, or within a building in at least one of the following ways: (1) minimizing the time required to identify utility assets, microgrid subsystems, or building circuits under heavy loading, (2) minimizing the time required to form a response to de-load the hotspots, (3) minimizing the time required to show the effects of the de-loading of hotspots, (4) minimizing cost of grid, microgrid, or building assets by reducing hardware redundancy by increasing insight and intelligence, (5) minimizing equipment outages by visually showing the state of the problem and allowing quick response.

Other goals and advantages of the invention will be further appreciated and understood when considered in conjunction with the following description and accompanying drawings, will be obvious from the description, or may be learned by the practice of the invention. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings, wherein like reference numerals across the several views refer to identical or equivalent features.

DETAILED DESCRIPTION

The detailed description set forth below in connection with the appended drawings is intended as a description of the presently preferred embodiments of systems and methods provided in accordance with aspects of the present invention and is not intended to represent the only forms in which the present invention may be constructed or utilized. The description sets forth the features and steps for making and using the test systems and methods of the present invention in connection with the illustrated embodiments. It is to be understood, however, that the same or equivalent functions and structures may be accomplished by different embodiments that are also intended to be encompassed within the spirit and scope of the invention.

Figure 1A:
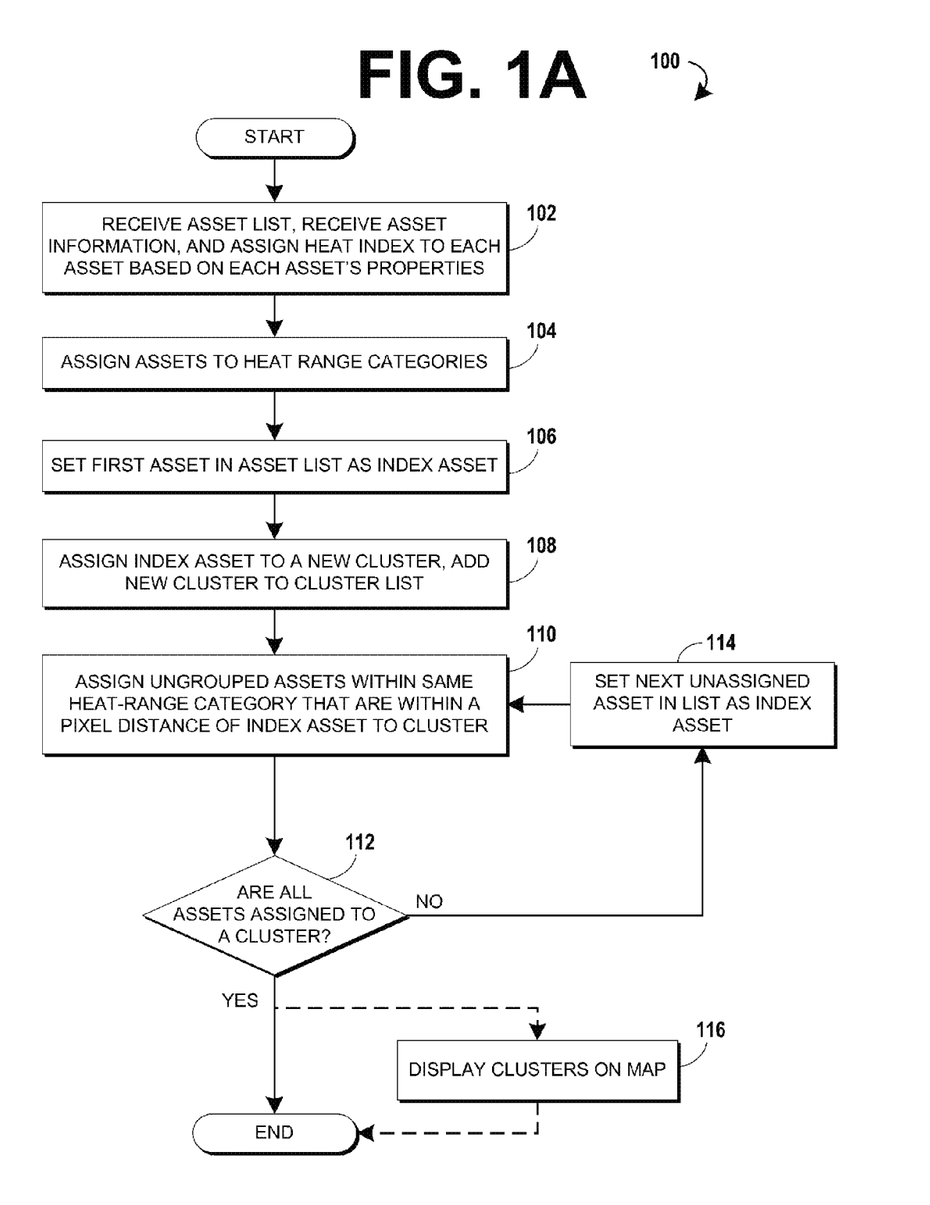
FIG. 1A is a flowchart showing a heat index generation and clustering process according to an embodiment of the invention.

Referring now to the figures in detail, FIG. 1A is a flowchart showing a heat index generation process 100 according to an embodiment of the invention. Starting at step 102, a list of assets and asset information are received, and a heat index is assigned to each asset in the list based on the asset properties received. The list of assets may come from a central data repository that keeps information about the location and properties of the assets that will be clustered in the process 100, such as a computerized server, printed database, or other accessible location. The asset information may also include data such as current asset loads, historical loads, temperatures, vibrations, whether the asset is presently being worked on or accessed by another client or server, electrical properties, and other important information. The heat index assigned to each asset is a number derived from its information that may reflect one property, (e.g., a heat index that varies with temperature only) but the heat index may be calculated based on more than one property as well (e.g., a heat index that varies with asset temperature, loading, power ratings, and duty factor).

Next, in step 104, the assets are assigned to heat-range categories. The calculation of a standard deviation normal distribution is an example of a possible method for differentiating the asset properties to identify assets that may be interesting due to having significant properties, but other methods may be used to determine heat range categories, such as by comparing assets' properties to the mean value of the properties, by comparing the assets' properties to a predefined categorization of properties, and by implementing other comparable methods that may be known in the art. For example, ranges of heat indices that may be assigned to different categories include predefined asset property values (e.g., 0-20 kW load for category A, 21-40 kW load for category B, etc.), standard deviations of the assets (e.g., 0-1 σ for category A, 1-2 σ for category B, 2-3 σ for category C, etc.), and other categorizations of asset properties.

Next, in step 106, an asset in the list of assets is set as an "index asset." The index asset is assigned to a new cluster in step 108 and the cluster is added to a cluster list. Unassigned assets that are within the same heat-index or heat-range category as the index asset and that are within a given pixel distance of the index asset are assigned to the cluster with the index asset in step 110, and then check 112 is performed to determine if all assets have been assigned to a cluster in the cluster list. If there are assets remaining that are unassigned, an unassigned asset in the list becomes the next index asset, as shown in step 114, and the process returns to step 108. Once all assets have been assigned to a cluster, the process ends.

In some embodiments, step 110 may define a point on the map or a point in space around which unassigned assets are clustered if they are within a given heat index category and pixel distance from the point instead of assigning assets based on their pixel distance from the index asset. For example, a map may be divided by an orthogonal grid, and the centers or other predesignated points of the partitioned grid squares may serve as the anchor points of pixel radii used in clustering assets. In other words, from each of these predesignated points a pixel radius is determined and unassigned assets from each heat index category are added to a cluster for that category. The orthogonal grid of this embodiment may vary in display size and geographical size as the user zooms in and out of the map, but it may be advantageous to establish a grid system that has a standard number of pixels or a standard distance between points, irrespective of the zoom level. Using this system, the clusters represent smaller numbers of assets as the user zooms into the map because mapped assets become more spaced apart and are therefore more likely to be assigned to different clusters. By increasing the number of clusters as the user zooms in, it becomes easier for the user to identify the exact location of significant assets and data in the heat map.

The process 100 may also include a step 116 of displaying the clusters on a heat map before ending the process. When displaying the clusters, each cluster is assigned a location on the map based on the assets it represents. This location may differ from the point used in step 110 when determining which assets are grouped to a cluster. For example, the displayed location of a cluster may be determined by (1) finding an average or centroid of geographical coordinates of the assets that the cluster represents and then assigning the average or centroid coordinates to the cluster for display, (2) selecting a representative asset from the assets in the cluster and using the coordinates of the representative asset to be the display coordinates of the cluster, (3) predetermining the distance between clusters on the heat map and assigning coordinates for clusters to predetermined coordinates for assets around the predetermined positions, (4) adjusting the displayed location of clusters based on their distance from other clusters or (5) other similar mapmaking methods for selecting a cluster's location. Displaying the cluster list allows a user to visually inspect the data of the clusters more easily, but if step 116 is omitted from the process 100 the cluster data may still be useful for asset data analysis and for storage in anticipation of future display. In some embodiments, displaying the cluster means printing it on a page, affixing it to another tangible medium, or displaying the cluster at a point on an electronic screen or other transitory display device.

When the cluster list is displayed in step 116, coordinates for every cluster in the heat map may be generated, or just the clusters in the user's present view may have coordinates generated. Similarly, all clusters may be placed on a map, or just clusters in the user's view.

The user's view may be referenced when generating the heat map displayed in step 116. This "user view" may differ in different embodiments, such as being a bird's-eye view, road-level view, satellite view, terrain view, and aerial view, which may each show a different heat map appearance that a user may wish to access. The bounds of the user's view may determine the bounds of the map generated, but in some embodiments, a map is generated for bounds outside the user's view, even though the map beyond the user's view is not displayed unless or until the user pans his or her view across the bounds of the map generated beyond his or her view. Likewise, a map may be generated for zoom levels higher or lower than the current view of the user in anticipation of the user zooming in and out. This feature may assist in improving rendering times and improving the responsiveness of the heat map as the user changes views. In some embodiments it may also allow an indicator to be rendered on the display which directs the user's view toward assets or clusters having significant heat indices that are not within the bounds of the user's view since those areas have had heat maps generated as well. Generating a map assists a user to more easily spot and respond to abnormal conditions in the grid as they arise.

The "pixel distance" used in step 110 is a value representing a radius in the display within which all assets having the same heat-range category are added to a cluster. See also FIG. 5B and its corresponding description herein for further discussion of pixel distances.

A heat index is assigned to assets in step 102. Heat maps may be generated or changed to reflect different types of data used as a heat index, including but not limited to: (1) low voltage, where the map would help a user identify when abnormally low secondary voltage in an asset occurs, (2) over loads, where the map would indicate which loads are exceeding a utility-rated threshold, or (3) load margins, where the map would quickly identify the margin of available load than an asset can carry before it reaches a utility-rated threshold for maximum capacity.

In some embodiments, the data used by the algorithm to calculate the heat index of an asset may come from proprietary analysis tools used by the utility operator to calculate the flow of load handled by the assets in the electrical grid.

In some embodiments, changes in the conditions of the grid and assets can be viewed as an animation or video recording in a media player. The media player may allow the user to view the status of assets in an area and changes the assets encounter over a specified length of time. This enables users to inspect how the electrical grid reacts in relation to the time of day, month, year, or other time period. A media player may have the ability to play, pause, stop, or seek through frames of the recording or animation, allowing the user to select a specific time or data set to view.

Figure 1B:
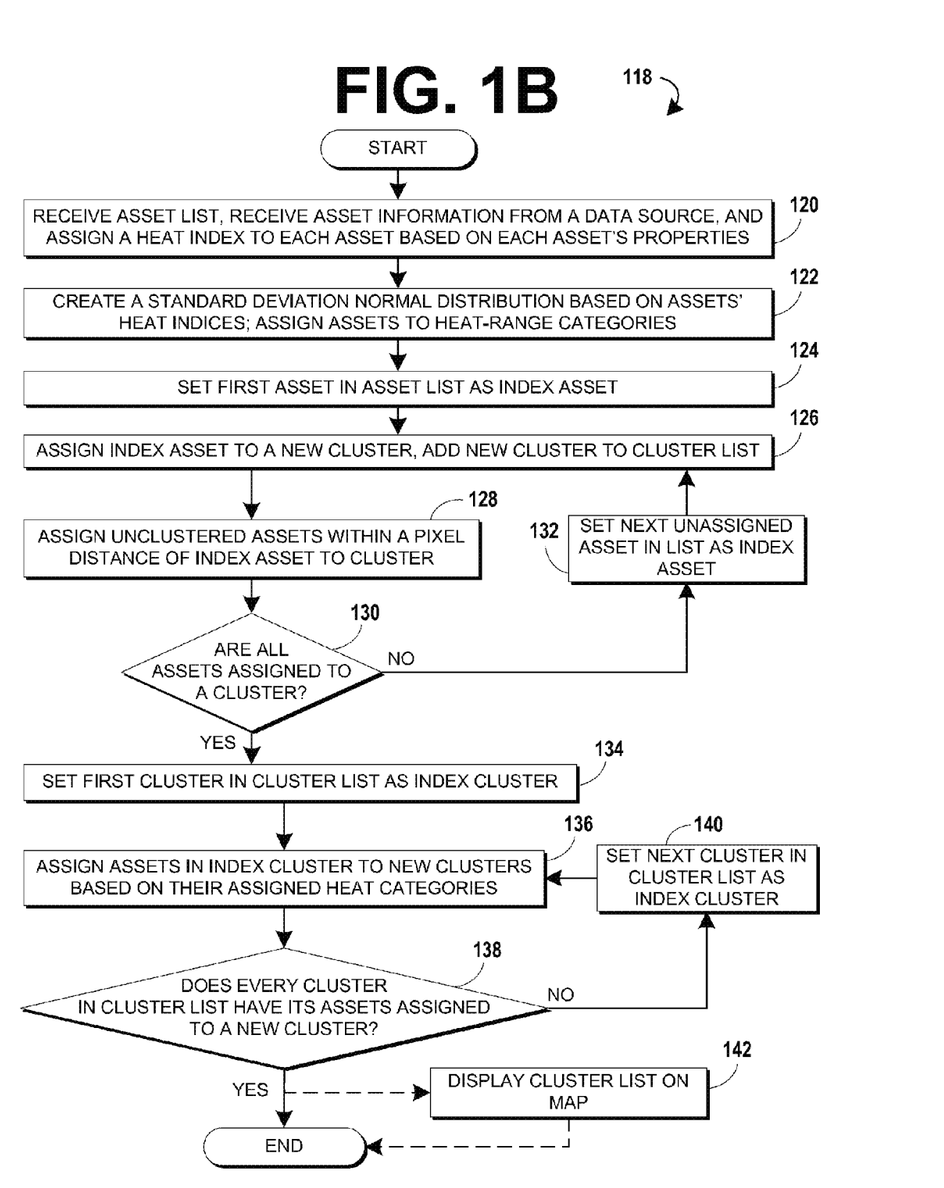
FIG. 1B is a flowchart showing a heat index generation and clustering process according to another embodiment of the invention.

FIG. 1B is a flowchart of a heat index generation and clustering process according to another embodiment of the invention. The process 118 begins at step 120 by receiving an asset list from a data source, receiving asset information from the assets or a data source, and assigning a heat index to each asset in the asset list based on each asset's properties, much like step 102 above. In step 122, a standard deviation normal distribution is created based on the assets' heat indices and the assets are assigned to heat-range categories. As in step 104, step 122 may alternatively directly assign assets to heat-range categories instead of generating a standard deviation normal distribution. Next in step 124 the first asset in the asset list is set as an index asset, and in step 126 the index asset is assigned to a new cluster, which is added to a cluster list. At step 128, unclustered assets within a pixel distance of the index asset are assigned to the cluster of step 126. The process then checks to see if all assets have been assigned to a cluster in step 130. If all assets have not been assigned, the process sets the next unassigned asset in the list as an index asset in step 132 and returns to step 126. If all assets have been assigned at check 130, the process continues by setting the first cluster in the cluster list as an index cluster at step 134. Then in step 136 assets in the index cluster are assigned to new clusters based on the assets' assigned heat categories. These new clusters are comprised of a subset of the assets that are assigned to the cluster in step 128 that all lie within the pixel distance of the index asset of that step, but they are now divided into new clusters that contain only those assets that have the same heat index categorization. These new clusters are not necessarily added to the cluster list. After this completes, check 138 is performed to determine whether every cluster in the cluster list has its assets assigned to a new cluster. If not, another cluster in the list (such as the next cluster in the list) becomes the index cluster in step 140 and the process returns to step 136. If check 138 returns an affirmative outcome, the process either ends or step 142 is executed, where the new clusters are displayed on a map in a manner identical or equivalent to the methods described in conjunction with step 116.

Performing this process 118 gives the user the ability in some embodiments to assign the assets to clusters which are assembled according to their proximity, then to assign assets within those clusters to be represented according to their heat indices. This order of clustering and re-clustering keeps the display of clusters on the map more closely tied to the positioning of the assets in the clusters, since clustering is not based on the assets' heat index or category alone. In some embodiments this process 118 improves the speed of generating and/or displaying the clusters on a map because the clusters can be generated/displayed, then further refined according to the heat categories in the clusters that were displayed and shown according to those re-clustered assets.

The two-step clustering process 118 also helps to prevent clusters of a specific heat category from overlapping with another cluster of the same heat category because all assets in that heat category will also be within the pixel distance of the index asset, and the displayed cluster of those assets will therefore also be the only cluster in that pixel distance range that represents that heat category. In some embodiments this method of generating and displaying a heat map is particularly useful for representing electrical assets since electrical assets having properties that are operating abnormally or are operating at dangerous or potentially dangerous levels are more prominently displayed on the map with their own cluster for each pixel distance radius shown on the map, and assets that fall into a "normal" heat category are likewise grouped together into one cluster even though there are typically much more assets operating at normal conditions than those operating at concerning levels.

In some embodiments the emphasis of grouping assets first by geography on the map and then by heat index provides predictability to grid crisis responders such as utility providers to more quickly and easily locate outlier grid assets' locations since the clusters are restricted to a specific pixel distance. Furthermore, when many assets with a significant heat category are displayed on the map, it can be instantly determined that assets in each of those portions of the map fall within that heat category—if the assets were assigned by category first, it would be more difficult to know the position of the assets when a significant-category cluster is displayed since assets over a less-predictable area would be included in the cluster. Some users may also find it useful that geographic distances and areas are first considered so that geographic features such as rivers, canals, parks, hills, or other areas without electrical assets are not displayed as having clusters shown within their bounds due to asset location averaging or centroid computation.

While many utility providers can detect a broad area in which grid assets are behaving inappropriately, the assets themselves that are having problems are very difficult to single out, and existing methods of analyzing problematic points in the grid and identifying failing assets are slow and inefficient. A heat map of assets allows a user to visually inspect a large amount of data instantaneously and detect problem assets immediately while eliminating guesswork or manual checking that is currently prevalent in these utility companies. By clustering the information shown in the heat map, distractions to the user are even further reduced and collapsed into the "background" of what is shown, bringing forward the most important information.

Figure 2A:
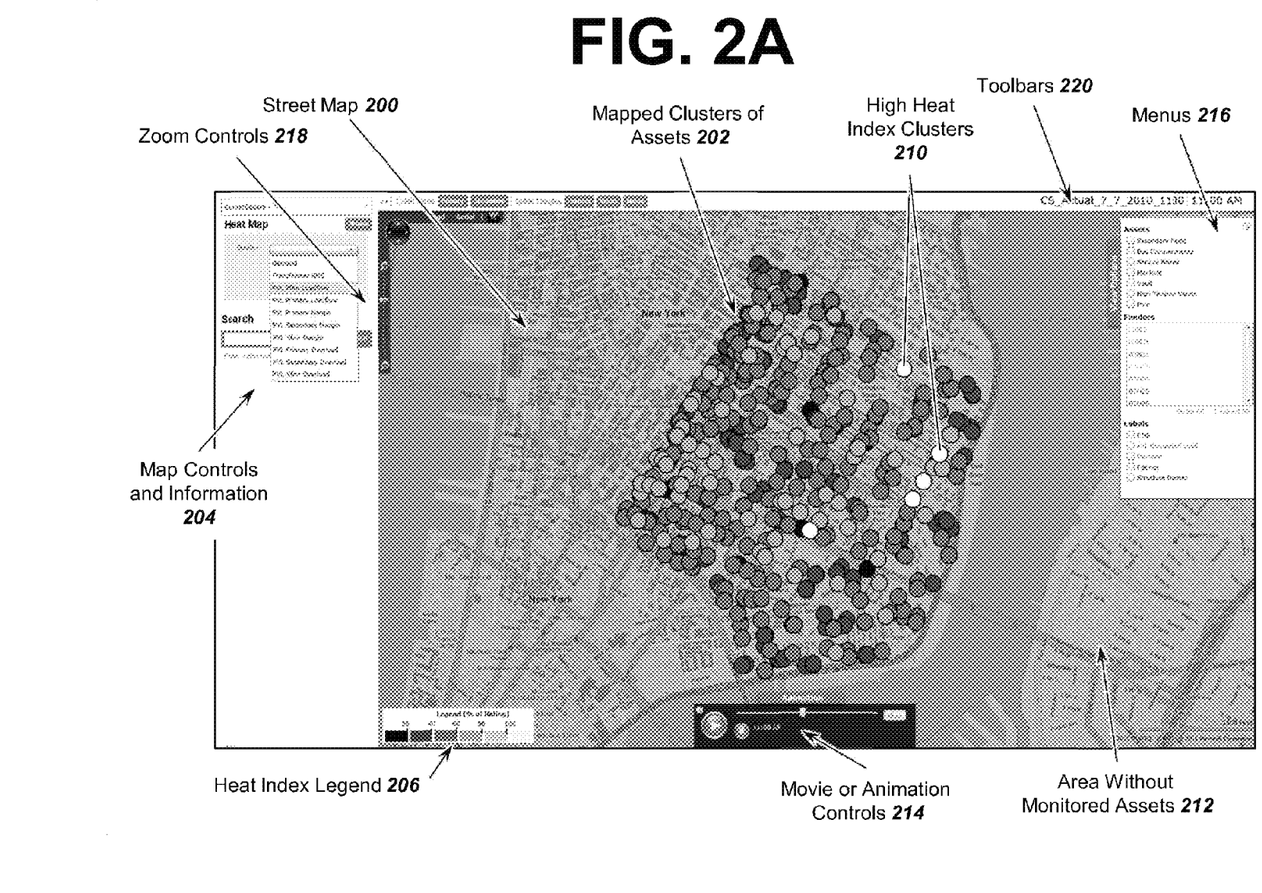
FIG. 2A shows an exemplary heat map generated according to the invention with color coding.

FIG. 2A shows an exemplary heat map generated according to an embodiment of the invention. In this example, a street map 200 shows mapped clusters of assets 202 with map controls and information 204, and a heat index legend 206 showing the heat index categories displayed. The locations of clusters are represented by circles. The circles are assigned a color based on where the asset falls in a standard deviation normal distribution of all of the assets. For example, assets that are within one standard deviation above the mean are shaded one color, assets that are more than one standard deviation above the mean are another shade, and assets that are within one standard deviation below the mean are another shade. Thus, a user can spot areas of heightened electrical load properties, e.g. high heat index clusters 210, by their color shading. Some areas of the street map 200 may not have assets monitored 212, or may have assets that are monitored but are not currently displayed. Movie or animation controls 214 may provide control over the data shown on the map, including changing the data presented based on the time it was recorded. Menus 216, zoom controls 218, and toolbars 220 may be added for user convenience in interacting with the map.

Icons of an asset or cluster of assets may be represented using different-colored shapes, as in the above example, but may also be represented using different-shaped icons such as stars, triangles, circles, and squares that correspond to different ranges of standard deviation values. Other icons or visual indicators may include various-sized shapes, such as larger or smaller shapes based on standard deviation or other heat category, displayed alphanumeric values, such as a display of a number on the heat map, or combinations of any such types of representations. For example, FIG. 2B shows a view of a heat map that combines colored circles and shapes for each asset or cluster of assets shown on the map.

As the user zooms into a particular geographical area of the heat map, the view of the assets is changed, and assets may thereby be clustered and re-clustered according to the algorithms disclosed previously. This results in each cluster representing a progressively smaller group or subset of assets because assets that would be previously clustered together are divided into separate clusters or are shown as a cluster containing a single asset. Likewise, when the user zooms out, the assets may be clustered and re-clustered according to the algorithms.

Figure 2B:
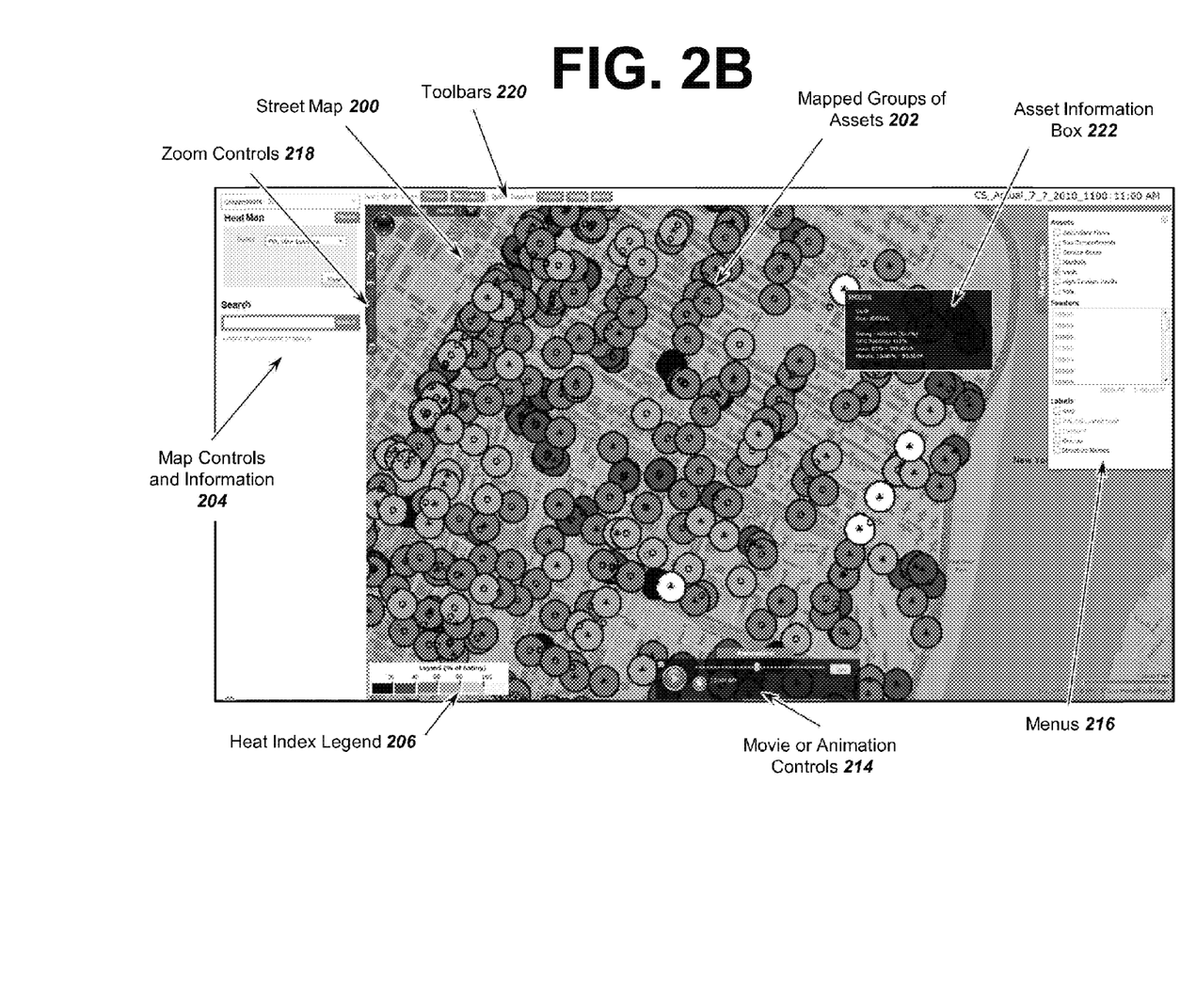
FIG. 2B shows an exemplary heat map with color coding and icons at a closer zoom level.

FIG. 2B shows a zoomed-in view of a portion of the street map 200 of FIG. 2A with individual assets indicated by shapes and color-coded circles. This figure illustrates that a user may access additional information about an asset by clicking or hovering a cursor over an asset's icon, revealing an asset information box 222. For instance, a snapshot of an asset's load, temperature, connectivity, or other properties may be presented when the user indicates interest in that asset. In some embodiments, the properties presented may include showing an icon for each asset included in the cluster selected by the user as if there were no clustering algorithm performed, so that the user may quickly identify specific assets in the area.

Figure 3A:
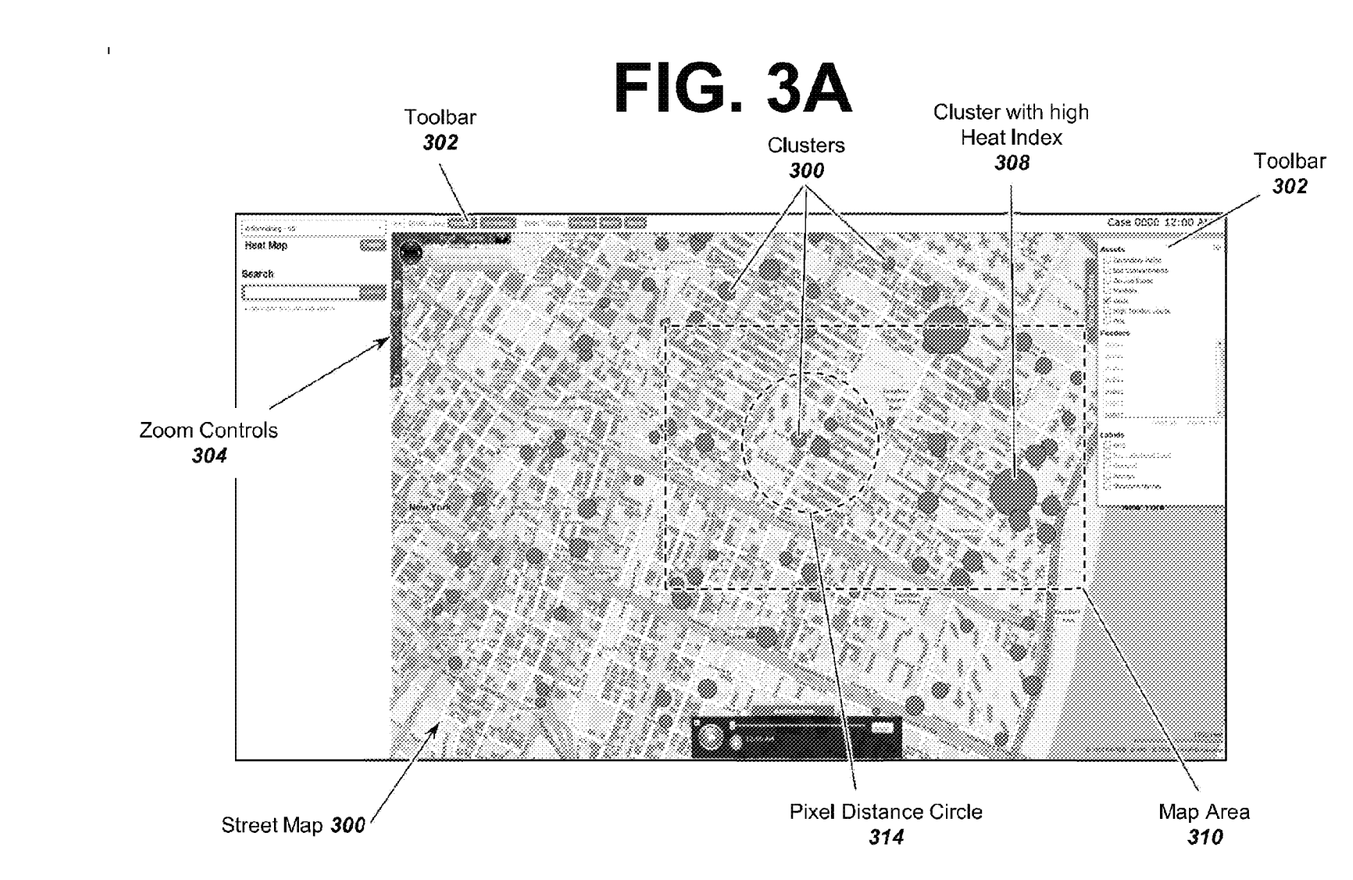
FIG. 3A shows an exemplary heat map generated according to an embodiment of the invention with size coding.

FIG. 3A is another example of a heat map showing circular clusters 300 on a street map that vary in size based on their component assets' heat categorizations, such as cluster 308 which has a high heat index and a corresponding large size. Toolbars 302 assist the user in manipulating the view, such as a zoom controls toolbar 304 that allows the user to expand or contract the scope of the bounds of the view.

Figure 3B:
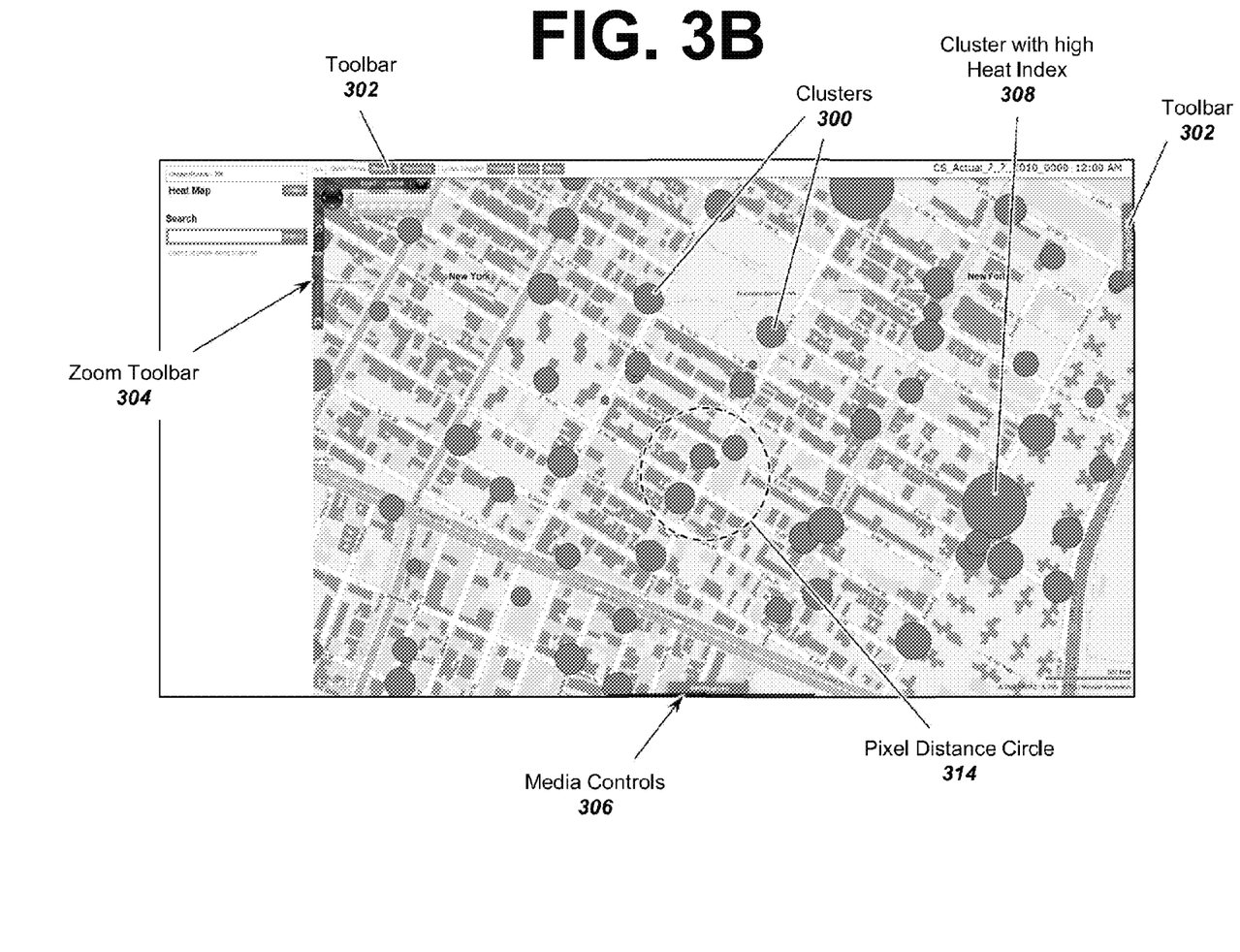
FIG. 3B shows an exemplary heat map with size coding at a closer zoom level.

If the user zoomed into map area 310, FIG. 3B would be displayed. The clusters 312 of FIG. 3B are more numerous than the clusters of FIG. 3A in map area 310 shown because the clusters generated in FIG. 3B are based on assets that are visually separated by a greater pixel distance on the display. Thus, when the clusters are generated, assets that were once associated with a cluster in FIG. 3A may be separated into multiple clusters in FIG. 3B. The pixel distance circles 314 in FIG. 3A and 3B help illustrate this concept.

A pixel distance circle 314 shows the area within which assets are gathered into clusters. For example, the pixel distance circle 314 of FIG. 3A shows the area in which assets are gathered into the clusters shown within the circle in FIG. 3A. Likewise, the pixel distance circle 314 in FIG. 3B shows the area in which assets are gathered into clusters for that part of FIG. 3B. The size of the pixel distance circles 314 in both figures is the same, but because FIG. 3A shows a greater area in its map overall, the pixel distance circle 314 of that figure shows that more assets will be included in the clusters that lie within that pixel distance circle 314 than the clusters in FIG. 3B.

In another embodiment, sensors such as current transformers (CTs), thermometers, or voltmeters are adapted and monitored to generate a heat map. For example, electrical circuits, subpanels, and/or panels within a building are measured and monitored and the data gathered is converted into a heat map of the building that may be used to discern hotspots of electrical activity, consumption, and other properties within the building.

Figure 4:
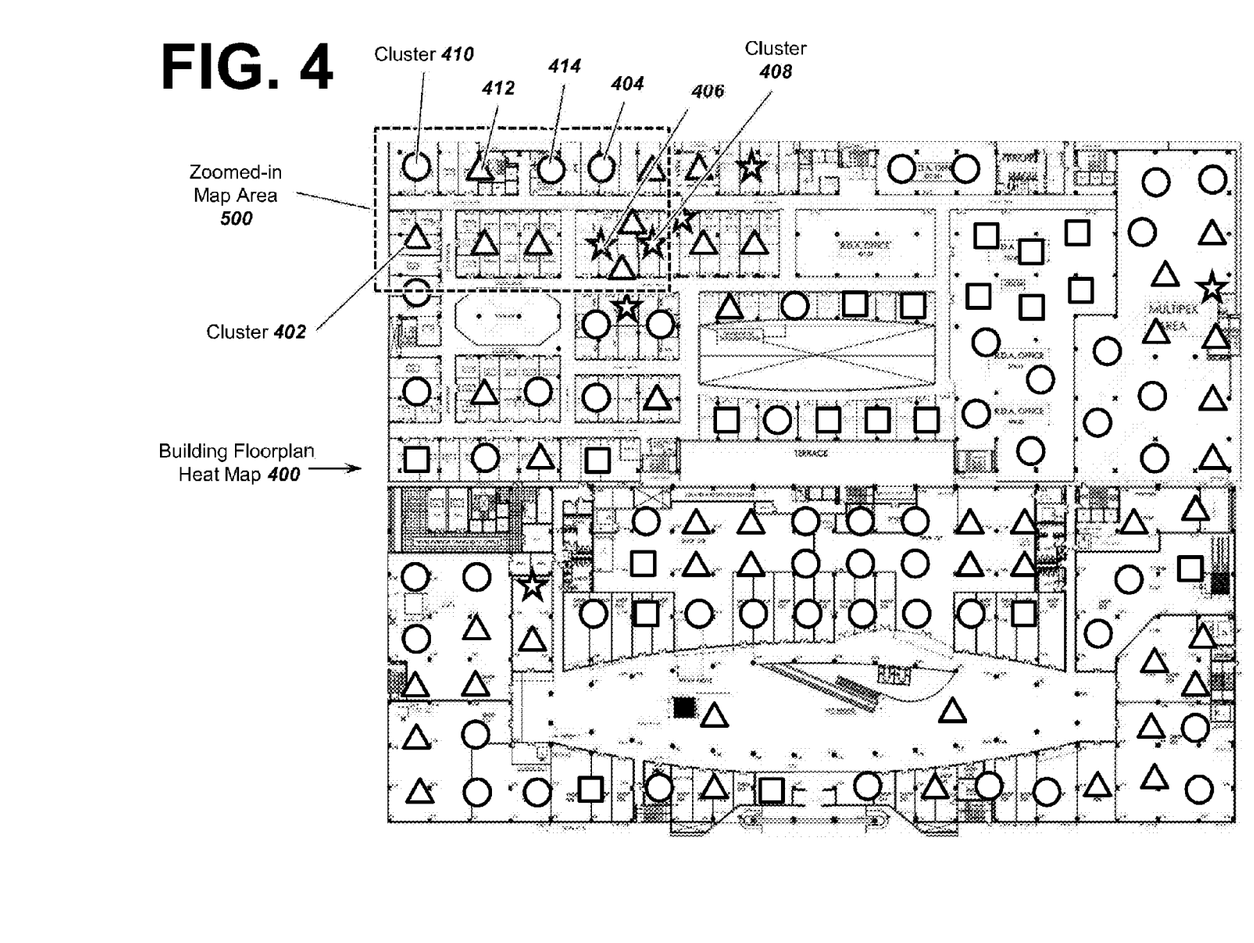
FIG. 4 shows a view of a heat map generated for a structure.

FIG. 4 shows a heat map generated for a large building. The building floorplan-based heat map 400 displays many icons of clusters of assets (e.g., clusters 402, 404, 406, 408, 410, 412). The cluster icons have different shapes to generally indicate the value of standard deviation or other heat category of the assets which they represent. For example, a star shape such as clusters 406 and 408 in this figure may represent assets having standard deviation in excess of one standard deviation from the mean and clusters 402 and 412 are triangular, which may represent assets having standard deviation between zero and one. Other shapes may represent assets having other ranges of standard deviation, such as the circles and squares shown.

Figure 5A:
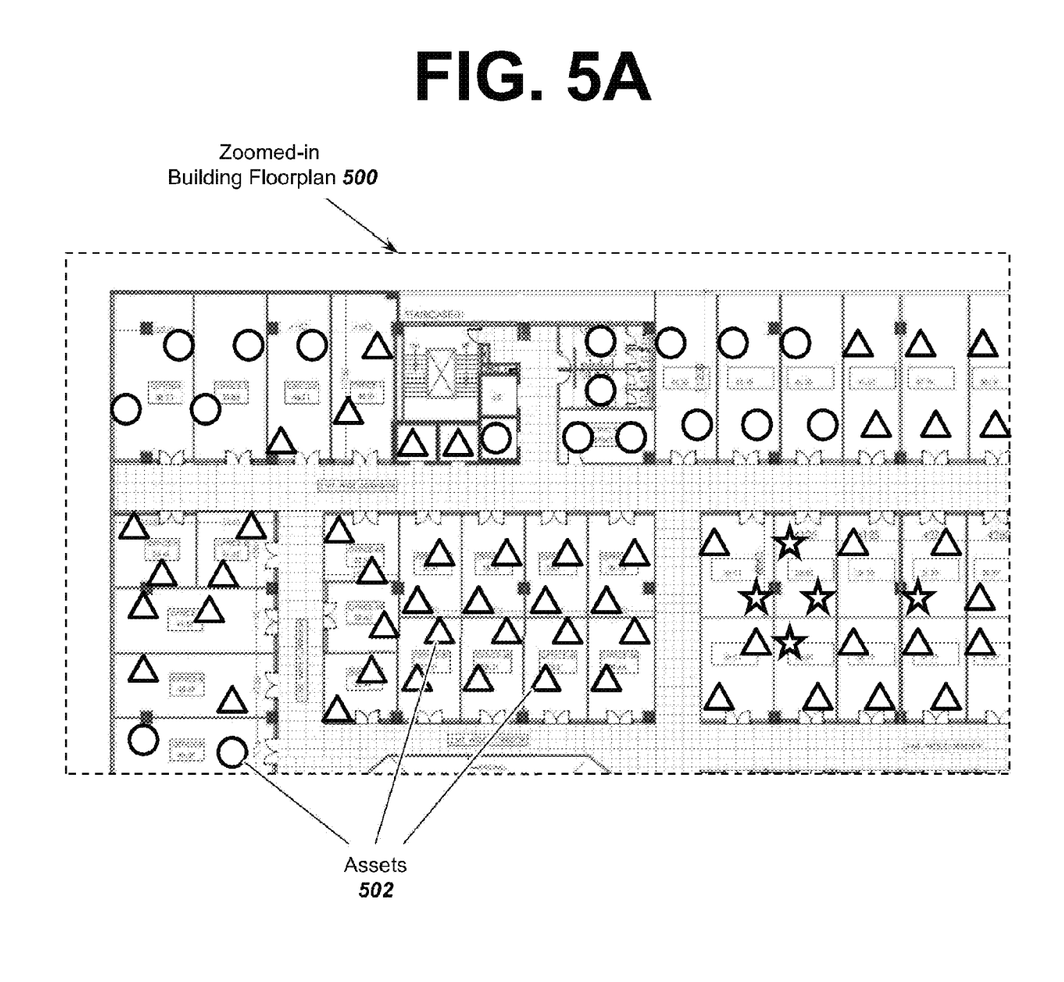
FIG. 5A shows a zoomed-in portion of a heat map generated for a structure.
Figure 5B:
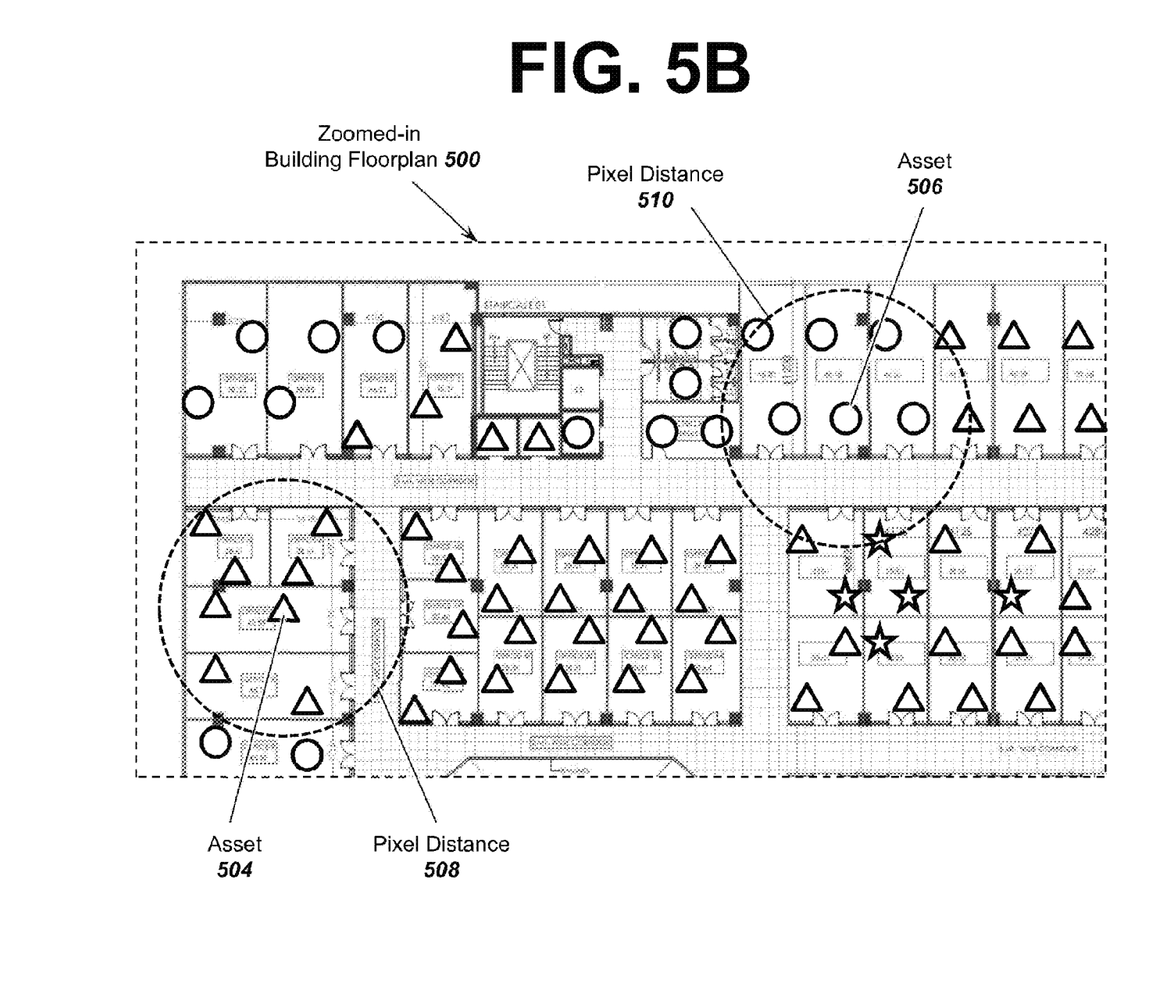
FIG. 5B shows a zoomed-in portion of a heat map generated for a structure with some assets and pixel distances indicated.

FIG. 5A shows a zoomed-in view of a portion of the structure of FIG. 4. This detailed building floorplan 500 shows assets 502 individually, or clusters having a single asset, instead of clusters of multiple assets as shown in FIG. 4. These assets are clustered together when the view is zoomed out to FIG. 4's ranges. For example, FIG. 5B shows two exemplary assets 504 and 506 that are part of the basis for clusters 402 and 404 in FIG. 4. A standard deviation normal distribution of all assets in the building is generated, and the standard deviation of each asset is assigned to a category and corresponding heat index (i.e., assets are assigned a shape such as the triangle for asset 504 and the circle for asset 506). Next, the process determines, for a given asset, such as asset 504, which other assets are within a pixel distance 508 of the asset 504 and assigns those assets to a cluster, e.g., cluster 402. The position of a cluster (e.g., 402) may be determined by taking a centroid or average of the positions of the assets it represents, may be selected to match the location of one of the assets in the cluster (e.g., the position of asset 504), or some other representative approximation that indicates the general area in which the member assets are located. If an average or centroid is determined, the effectiveness of the clustering method is reduced as the zoom level of the user's view is greatly zoomed out, as the pixel distance will include larger numbers of assets and the average will be skewed away from the location of any particular member asset it represents. At times an asset 506 will be near other assets that fit within other standard deviation categories within a pixel distance 510 of the asset's 506 location. In this embodiment the other assets are ignored when generating clusters for the standard deviation category of the asset 506.

Figure 5C:
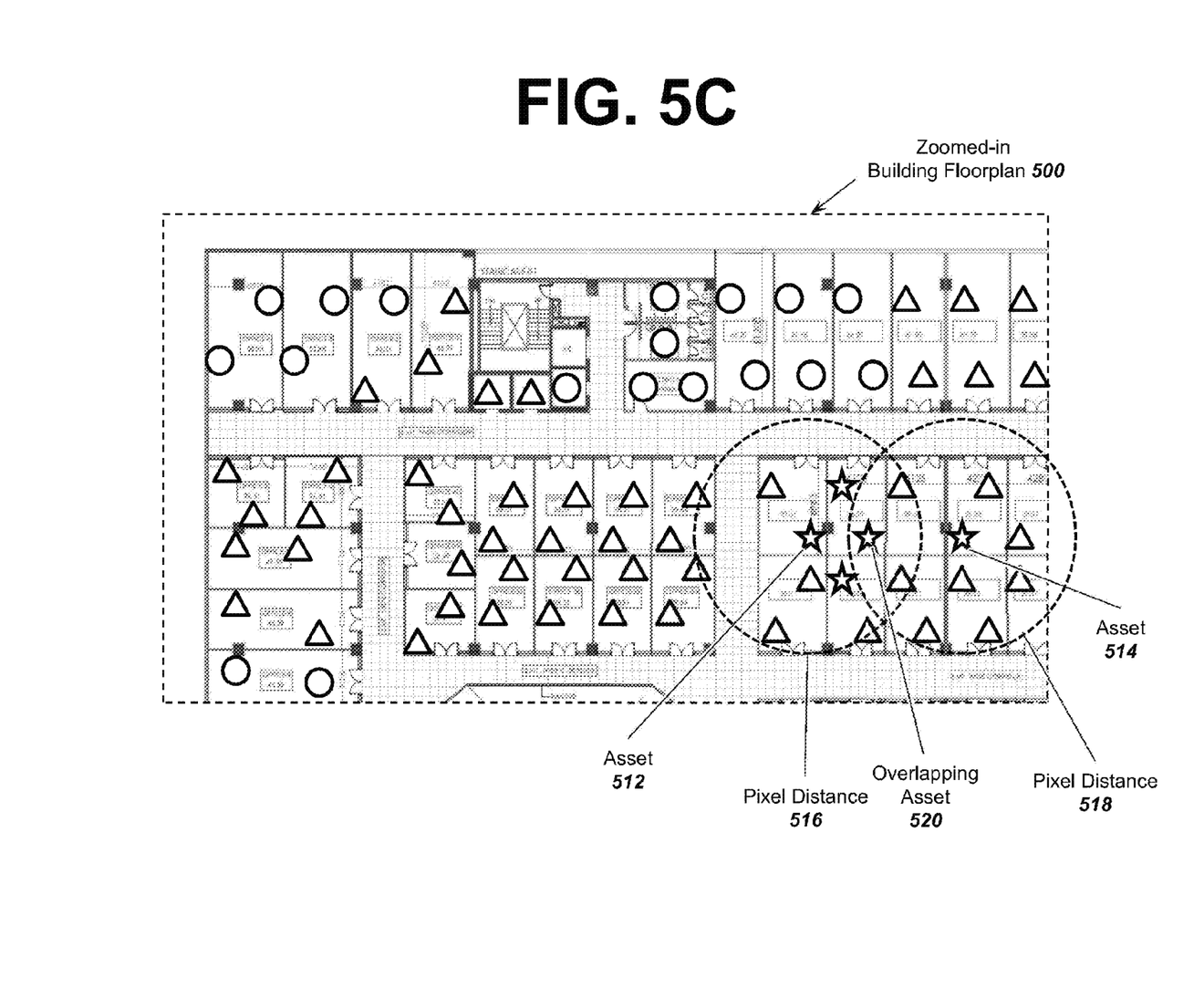
FIG. 5C shows a zoomed-in portion of a heat map generated for a structure with some assets and pixel distances indicated.

FIG. 5C shows a pair of star-categorized assets 512 and 514 near each other in the building view. When clusters are generated for these assets and those nearby them, an asset 520 is within the pixel distance 516 and 518 of both assets 512 and 514. In this case, only the first of the two clusters 406 and 408 will factor in asset 520 when the clusters are generated from assets 512 and 514. For example, if asset 512 is selected to generate a cluster before asset 514, it would cluster the star-category assets within pixel distance 516, and when asset 514 is selected while generating a cluster, asset 520 will be excluded from that asset because it has already been assigned to the cluster with asset 512 (i.e., cluster 406).

Figure 6:
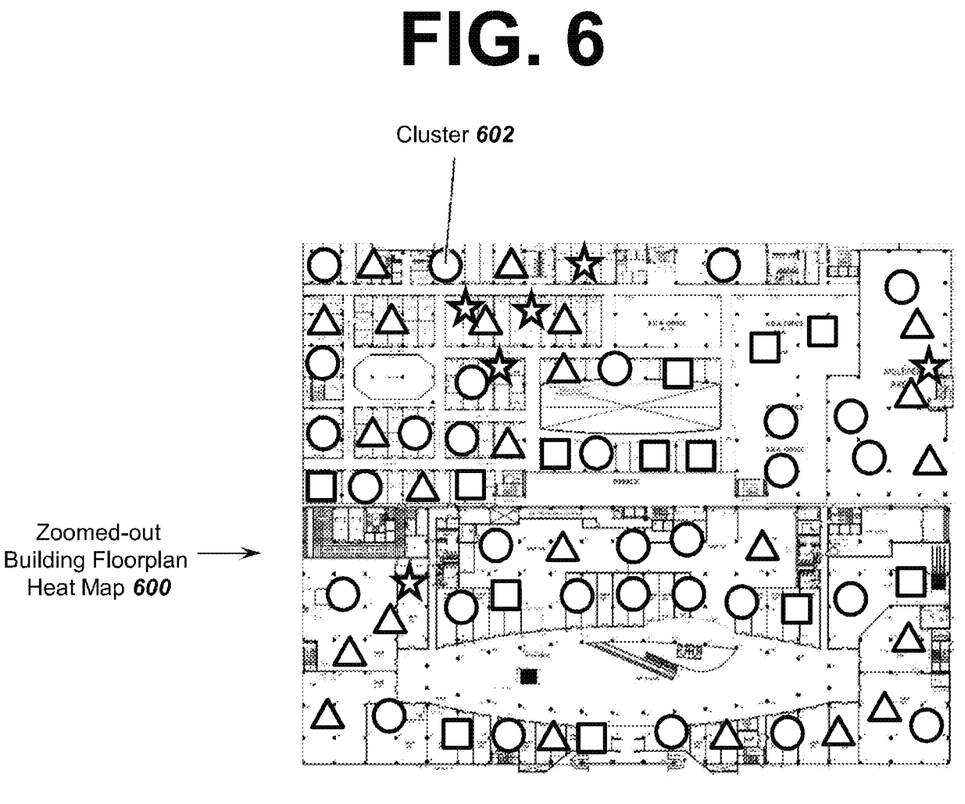
FIG. 6 shows a zoomed-out view of a heat map generated for a structure.

As shown in FIG. 6, if the user zooms out from the heat map zoom level of FIG. 4, clusters are merged, as the pixel distance between assets includes more assets per cluster. For example, in heat map 600, cluster 404 merges with another circle-categorized cluster 414 to produce cluster 602. Many other clusters are similarly affected in this figure to show the reduction of complexity and detail of the heat map after zooming out.

This information may be adapted to be replayed or animated over the course of a day, week, month, or other time period to visualize how loads within the building are utilized and shift throughout the timeframe. A building manager with this information may then be able to analyze changes in the loading of the structure that would be otherwise difficult and tedious to observe. A heat map of this embodiment may be used to proactively reduce demand charges assessed by a utility and may help identify under-utilized circuits where more loads can be added or reallocated. For example, if a structure has office space on the second floor and a machine shop on the first floor, an electrical heat map generated would likely show hot areas for electricity consumption on the first floor, and less consuming areas on the second floor. This heat map may assist the building manager to find ways to route more power consumption to the second floor to even out loads within the structure. Building managers who sublease portions of their structures may find this advantageous in assigning lessees to certain areas or structures to reduce the burdens of demand charges.

In another embodiment, sensor readings or status messages from individual subsystems within a microgrid are gathered to discern electrical hotspots within the microgrid. A microgrid for these purposes is a network of electrical connections, loads, generators, electric vehicle chargers, uninterruptible power supply (UPS) systems, smart meters, automated demand response capable devices, and/or building management systems that is smaller than and/or separate from a utility distribution network. These microgrids may range from the loads and generation present at a building or may span many buildings or wider geographical areas, but they are not part of a standard utility distribution grid. This embodiment allows the operators of a microgrid to monitor and manage operations of the subparts of the microgrid and illustrates that the process of the invention may be useful outside a utility distribution network or localized building.

Another embodiment may use data from a plurality of microgrid systems scattered in a given region to generate a heat map that can be used to forecast demand for electricity without interfacing with the region's utility provider or its distribution grid models. In this embodiment the heat index algorithm maps a number of microgrids within a network of distributed microgrid systems. The resulting microgrid network heat map can be used to forecast demand in a geographic area with a sampling of microgrid demand data points without interfacing to the local electric utility.

Data from these embodiments may be replayed with a media player over the course of a day, week, month, or other time period to visualize how energy and power is utilized and shifts throughout the timeframe.

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible and non-transitory physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable or computer-executable instructions (e.g. software) and/or computer-readable data (i.e., information that may or may not be executable). In the present example, a computer-readable medium (such as memory) may be included to store instructions for the generation of a heat map of assets or to perform other actions and processes disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments. The invention is also defined in the following claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise or context dictates otherwise. Similarly, a group of items linked with the conjunction "or" should not be read as requiring mutual exclusivity among that group, but rather should also be read as "and/or" unless expressly stated or context dictates otherwise. Furthermore, although items, elements or component of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method of generating an electronic heat map of assets, comprising:
   receiving a list of assets, the list having asset status information;
   assigning the assets to one or more heat range categories based on the asset status information;
   assigning assets operating within a zone to a zone cluster;
   assigning the assets of the zone cluster to one or more category clusters according to the heat range category assigned to the assets of the zone cluster such that there is one category cluster for each heat range category to which the assets in the zone cluster were assigned;
   determining a position for one or more of the category clusters on an electronic map;
   generating the map in a non-transitory computer-readable medium with at least one of the category clusters configured to be displayed on the map at the position of the one or more of the category clusters.

2. The method of claim 1, further comprising:
   displaying a category cluster on the map at the determined position on an electronic display device.

3. The method of claim 2, wherein the map comprises a user view area, and wherein an indicator is displayed on the map if the category cluster is not within the user view area, the indicator indicating the position of the category cluster.

4. The method of claim 2, further comprising:
   displaying an animation of changes to the category cluster over time.

5. The method of claim 2, further comprising:
   displaying the asset status information of one or more assets in a displayed category cluster in response to a user selecting the displayed category cluster.

6. The method of claim 5, wherein the asset status information displayed includes the location of one or more assets assigned to the displayed category cluster in the zone.

7. The method of claim 1, wherein the position of the category cluster is determined as an average or centroid of the positions of all assets assigned to the category cluster.

8. The method of claim 1, wherein the zone is a microgrid and the assets are electrical devices connected to the microgrid.

9. The method of claim 1, wherein the zone is an electrical network and the assets are electrical devices connected to the electrical network.

10. The method of claim 9, wherein the electrical network is contained within a building or structure.

11. The method of claim 1, wherein the zone is a geographical area and the assets are electrical devices in the area.

12. The method of claim 11, wherein the geographical area is defined by a distance from an index asset.

13. The method of claim 12, wherein the distance is defined by a pixel distance as displayed by the map to a user.

14. A non-transitory computer readable medium including computer-executable instructions stored thereon for performing a method for generating a heat map of assets, the method comprising:
   receiving a list of assets, the list having asset status information;
   assigning the assets to one or more heat range categories based on the asset status information;
   assigning assets operating within a zone to a zone cluster;
   assigning the assets of the zone cluster to one or more category clusters according to the heat range category assigned to the assets of the zone cluster such that there is one category cluster for each heat range category to which the assets in the zone cluster were assigned; and
   determining a position for one or more of the category clusters on a map.

15. The non-transitory computer readable medium of claim 14, wherein the method further comprises:
   displaying a category cluster on the map at the determined position.

16. The non-transitory computer readable medium of claim 15, wherein the method further comprises:
   displaying the status information of one or more assets in a displayed category cluster in response to a user selecting the displayed category cluster.

17. A method of generating a heat map of electrical assets, comprising:
   receiving a list of assets, the list containing an electrical property for each of the assets;
   assigning the assets to heat range categories based on the electrical property;
   assigning assets within the same heat range categories that are also within a zone to clusters, the clusters corresponding to each heat range category to which assets were assigned;
   determining a position for one or more of the clusters on an electronic map;
   generating the map in a non-transitory computer-readable medium with at least one of the clusters displayed on the map at the position.

18. The method of claim 17, further comprising:
   displaying the clusters on the map at the determined position on an electronic display device.

19. The method of claim 17, wherein the heat range categories are determined based on the statistical deviation of the electrical property of each asset from a representative value of the electrical properties of all the assets.

20. The method of claim 17, wherein the heat range categories comprise predetermined ranges of possible values of the electrical property of each asset.

* * * * *